(12) United States Patent
Tsuji (10) Patent No.: US 10,866,174 B2
(45) Date of Patent: Dec. 15, 2020

(54) SYNCHRONIZATION CIRCUIT FOR MATERIAL TESTER AND MATERIAL TESTER

(71) Applicant: Shimadzu Corporation, Kyoto (JP)

(72) Inventor: Hiroshi Tsuji, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 173 days.

(21) Appl. No.: 15/774,080

(22) PCT Filed: Feb. 23, 2016

(86) PCT No.: PCT/JP2016/055194
§ 371 (c)(1),
(2) Date: May 7, 2018

(87) PCT Pub. No.: WO2017/145255
PCT Pub. Date: Aug. 31, 2017

(65) Prior Publication Data
US 2018/0328825 A1    Nov. 15, 2018

(51) Int. Cl.
*G01N 3/08* (2006.01)
*G05B 19/00* (2006.01)
*G05B 19/042* (2006.01)

(52) U.S. Cl.
CPC ............ *G01N 3/08* (2013.01); *G05B 19/00* (2013.01); *G01N 2203/0094* (2013.01);
(Continued)

(58) Field of Classification Search
CPC ............ G01N 3/08; G01N 2203/0094; G01N 2203/0682; G05B 19/00; G05B 19/0423; G05B 2219/25472
See application file for complete search history.

(56) References Cited

U.S. PATENT DOCUMENTS 3,384,874 A * 5/1968 Garrett .................. H04Q 9/16
                                              340/3.55
3,522,588 A * 8/1970 Clarke, Jr. ......... G05B 19/4181
                                              340/12.12
(Continued)

FOREIGN PATENT DOCUMENTS

FR           2363095 A1      3/1978
JP           51-24284 A      2/1976
(Continued)

OTHER PUBLICATIONS

Extended European Search Report dated Aug. 30, 2019, including the Supplementary European Search Report and the European Search Opinion, in connection with corresponding EP Application No. 16891414.1 (7 pgs.).
(Continued)

*Primary Examiner* — Jonathan M Dunlap
(74) *Attorney, Agent, or Firm* — Maier & Maier, PLLC (57) ABSTRACT

A synchronous controller is connected to each of boards by one communication wire, and one communication path is formed between the synchronous controller and each of the boards. A multiple synchronization signal S in which a plurality of synchronization signals are multiplexed is transmitted from the synchronous controller to each of the boards. Signal extraction units as extraction means for recognizing synchronization signals included in the multiple synchronization signal S and extracting the individual synchronization signals are provided in the boards, respectively. The individual synchronization signals are extracted from the multiple synchronization signal S input to the boards by the signal extraction units, respectively.

9 Claims, 7 Drawing Sheets

(52) U.S. Cl.
CPC .. *G01N 2203/0682* (2013.01); *G05B 19/0423* (2013.01); *G05B 2219/25472* (2013.01)

(56) References Cited

U.S. PATENT DOCUMENTS

| | | | | |
|---|---|---|---|---|
| 3,946,362 | A | * 3/1976 | Sumida | G08C 15/12 |
| | | | | 370/517 |
| 3,965,366 | A | * 6/1976 | Sumida | G08C 15/12 |
| | | | | 307/39 |
| 3,968,477 | A | 7/1976 | Sumida et al. | |
| 4,136,333 | A | * 1/1979 | Sumida | G08C 15/12 |
| | | | | 340/3.42 |
| 5,271,584 | A | * 12/1993 | Hochman | B61L 1/188 |
| | | | | 246/182 R |
| 2005/0065618 | A1 | 3/2005 | Burkatovsky | |
| 2010/0028009 | A1* | 2/2010 | Leung | H04L 7/042 |
| | | | | 398/98 |
| 2013/0055823 | A1 | 3/2013 | Kawano | |

FOREIGN PATENT DOCUMENTS

| | | | | |
|---|---|---|---|---|
| JP | 55-5759 | B2 | 2/1980 | |
| JP | 59190753 | A | * 10/1984 | H04L 5/1484 |
| JP | 110353/1991 | U | 11/1991 | |
| JP | 2007-218809 | A | 8/2007 | |
| JP | 5435135 | B | 1/2012 | |

OTHER PUBLICATIONS

International Search Report and Written Opinion dated May 17, 2016 of corresponding application No. PCT/JP2016/055194, 7 pgs.

* cited by examiner

SYNCHRONIZATION CIRCUIT FOR MATERIAL TESTER AND MATERIAL TESTER

FIELD

The present invention relates to a synchronous circuit for a material testing machine synchronously operating a plurality of functional units and a material testing machine provided with the synchronous circuit.

BACKGROUND

Arranged in a material testing machine performing material testing are a load mechanism giving a test load to a test piece and a plurality of measuring devices such as a load detector detecting a test force given to the test piece by the load mechanism and a displacement meter detecting displacement generated in the test piece. Configured in the material testing machine as described above are a plurality of circuits such as a detection circuit converting a physical quantity detected by the measuring devices from an analog signal to a digital signal and inputting the digital signal to a control unit and an operating circuit operating the testing machine by converting a command value for controlling an operation of a motor as a load mechanism driving source from the control unit from a digital signal to an analog signal (see Patent Document 1 and Patent Document 2).

CITATION LIST

Patent Document

Patent Document 1: JP-A-2007-218809
Patent Document 2: Japanese Patent No. 5435135

SUMMARY OF THE DISCLOSURE

Figure 9:
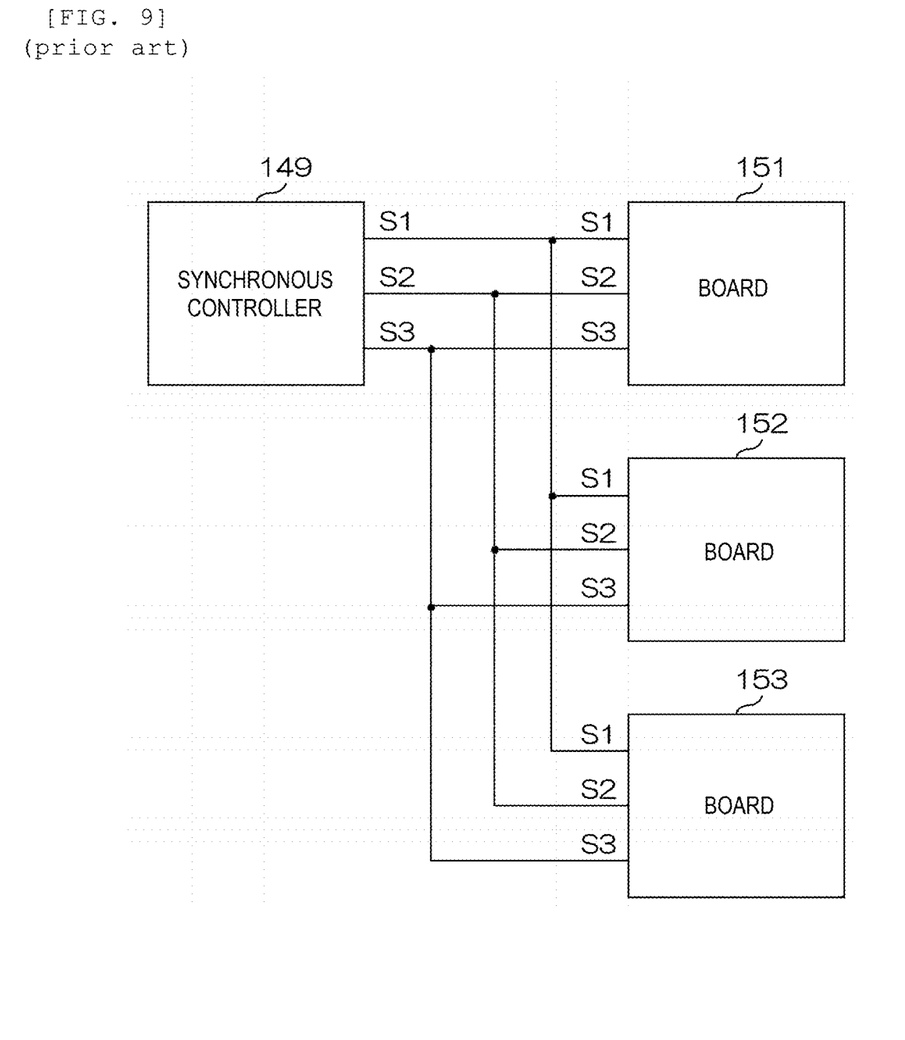
FIG. 9 is a block diagram illustrating the outline of a synchronous circuit according to the related art.
Figure 10:
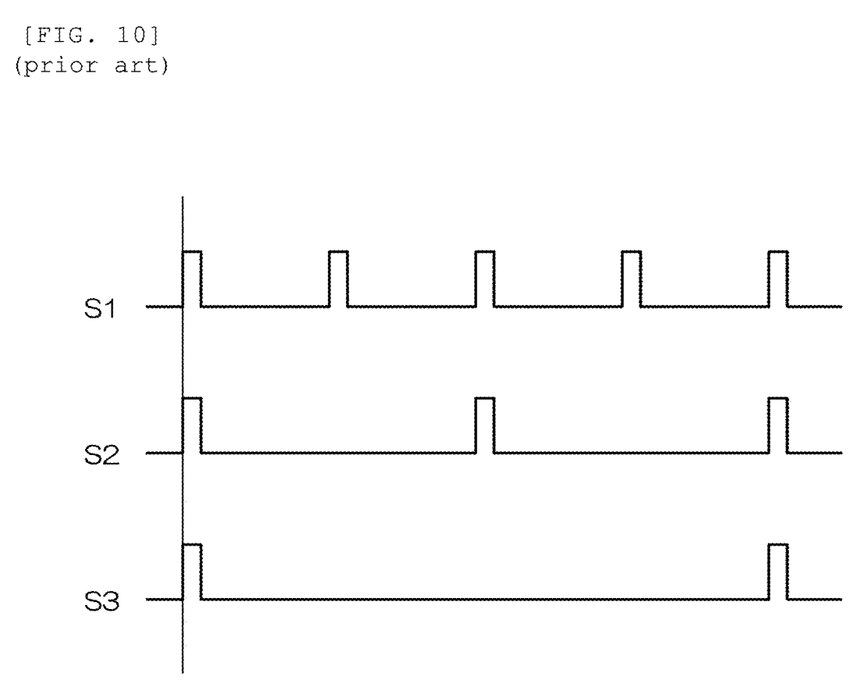
FIG. 10 is an explanatory diagram of a synchronization signal according to the related art.

FIG. 9 is a block diagram illustrating the outline of a synchronous circuit according to the related art. FIG. 10 is an explanatory diagram of a synchronization signal according to the related art. A physical quantity detection circuit and a load mechanism operating circuit in a material testing machine are configured as units in which function-executing parts are placed on separate boards. A synchronous circuit in which a synchronous controller 149 and each of boards 151, 152, and 153 are connected to each other by communication wiring is organized so that a synchronized operation is performed by an analog-to-digital (AD) converter and a digital-to-analog (DA) converter mounted on the separate boards.

In the related art, communication paths are provided between the synchronous controller 149 and each of the boards 151, 152, and 153 and the number of communication paths depends on the number of synchronization signals having different frequencies. In the synchronous circuit that is illustrated in FIG. 9, communication paths are provided to respond to each of three synchronization signals S1, S2, and S3 having different pulse repetition cycles in the pulse train that is illustrated in FIG. 10. The synchronization signals S1, S2, and S3 are respectively transmitted from the synchronous controller 149 to the boards 151, 152, and 153 through the communication paths assigned to the respective signals. Each of the synchronization signals S1, S2, and S3 indicates the timing of an operation to be synchronized in each circuit. For example, when data output from the AD converter and the DA converter of the circuits are synchronized at a timing specified in the synchronization signal S1, the synchronization signal S1 is transmitted from the synchronous controller to each board via the communication path through which the synchronization signal S1 is transmitted.

The synchronous circuit according to the related art is problematic in that the number of communication paths and the number of synchronization signals should be equal to each other, the number of communication wiring increases as the number of synchronization signals increases, and handling of wiring is complicated as described above. In addition, as the number of communication paths is determined during circuit design, an increase or decrease in the number of synchronization signals after circuit design requires a time-taking change in circuit design, which is another problem.

The invention has been made to solve the above problems, and an object thereof is to provide a synchronous circuit for a material testing machine and a material testing machine in which a plurality of synchronization signals are multiplexed in one communication path.

Solution to Problem

A synchronous circuit is provided with a synchronous controller synchronizing operations of a plurality of functional units constituting a material testing machine, communication paths are provided to be connected to the synchronous controller and the respective functional units, the synchronous controller transmits a multiple synchronization signal in which a plurality of synchronization signals are multiplexed to the plurality of functional units via one communication path, and each of the plurality of functional units is provided with extraction means and the extraction means recognize and extract the respective synchronization signals from the multiple synchronization signal.

According to the invention, in the synchronous circuit for a material testing machine according to the invention, the multiple synchronization signal is a signal in which each of the plurality of synchronization signals included in the multiple synchronization signal is a multiplexed signal with a frequency as 1/integer of a closest higher frequency and a pulse width in a pulse train varies with the number of the plurality of synchronization signals included in the multiple synchronization signal.

According to the invention, in the synchronous circuit for a material testing machine according to the invention described, an analog circuit or a digital circuit constitutes the extraction means.

According to the invention, in the synchronous circuit for a material testing machine according to the invention, the multiple synchronization signal is a signal in which a signal with a frequency as 1/integer of the synchronization signal with a highest frequency among the plurality of synchronization signals included in the multiple synchronization signal is multiplexed and has a pulse train in which a pulse train of the highest-frequency synchronization signal is used as a reference and pulses of the other synchronization signals are placed at predetermined positions behind a position of a pulse of the highest-frequency synchronization signal in the pulse train.

According to the invention, in the synchronous circuit for a material testing machine according to the invention, the multiple synchronization signal includes a synchronization bit as a common multiple of frequencies of the plurality of synchronization signals included in the multiple synchronization signal and has a pulse train in which respective pulses of the plurality of synchronization signals are placed at predetermined different positions with respect to a position of the synchronization bit in the pulse train.

According to the invention, in the synchronous circuit for a material testing machine according to the invention, a digital circuit constitutes the extraction means.

According to the invention, in the synchronous circuit for a material testing machine according to the invention, a digital circuit constitutes the extraction means.

According to the invention, a material testing machine includes a load mechanism giving a test load to a test piece, a measuring device detecting a change in physical quantity in the test piece, and a control device including a calculation control unit calculating a controlled variable of the load mechanism and calculating a physical quantity based on a value detected by the measuring device and a display section displaying a result of the calculation by the calculation control unit, in which the control device includes a load mechanism control unit converting the controlled variable calculated by the calculation control unit into an operation signal of a power source of the load mechanism and outputting the operation signal, a physical quantity detection unit receiving input from the measuring device, and a display unit for displaying the physical quantity calculated by the calculation control unit in the display section, and the control device includes the synchronous circuit for a material testing machine according to the invention.

Advantageous Effects of the Invention

According to the inventions, the synchronous controller transmits the multiple synchronization signal in which the plurality of synchronization signals are multiplexed to one of the plurality of functional units via one communication path and the reception sides are provided with the extraction means for recognizing and extracting the individual synchronization signals from the multiple synchronization signal. Accordingly, one path is sufficient for wiring between the synchronous controller and the boards and units as the functional units and wiring during synchronous circuit organization can be simplified. In addition, an easy response is possible and no change in circuit design is required, unlike in the related art, even in a case where the number of synchronization signals is to be increased.

According to the invention, the multiple synchronization signal is a signal in which each of the plurality of synchronization signals included in the multiple synchronization signal is the multiplexed signal with the frequency as 1/integer of the closest higher frequency and the pulse width in the pulse train varies with the number of the plurality of synchronization signals included in the multiple synchronization signal. Accordingly, the configuration of the circuit receiving the multiple synchronization signal and extracting the individual synchronization signals can be simplified.

According to the invention, the multiple synchronization signal is a signal in which the signal with the frequency as 1/integer of the synchronization signal with the highest frequency among the plurality of synchronization signals included in the multiple synchronization signal is multiplexed and has the pulse train in which the pulses of the other frequencies are placed based on the pulse train of the highest-frequency synchronization signal. The frequency of the synchronization signal can be selected without considering the relationship between the other synchronization signals insofar as the condition is satisfied that the frequency of the synchronization signal is 1/integer of the frequency of the highest-frequency synchronization signal.

According to the invention, the multiple synchronization signal includes the synchronization bit as a common multiple of the frequencies of the plurality of synchronization signals included in the multiple synchronization signal and has the pulse train in which the respective pulses of the plurality of synchronization signals are placed based on the position of the synchronization bit in the pulse train. Accordingly, placement of the pulses of the plurality of synchronization signals in the pulse train can be performed more freely.

DETAILED DESCRIPTION

Figure 1:
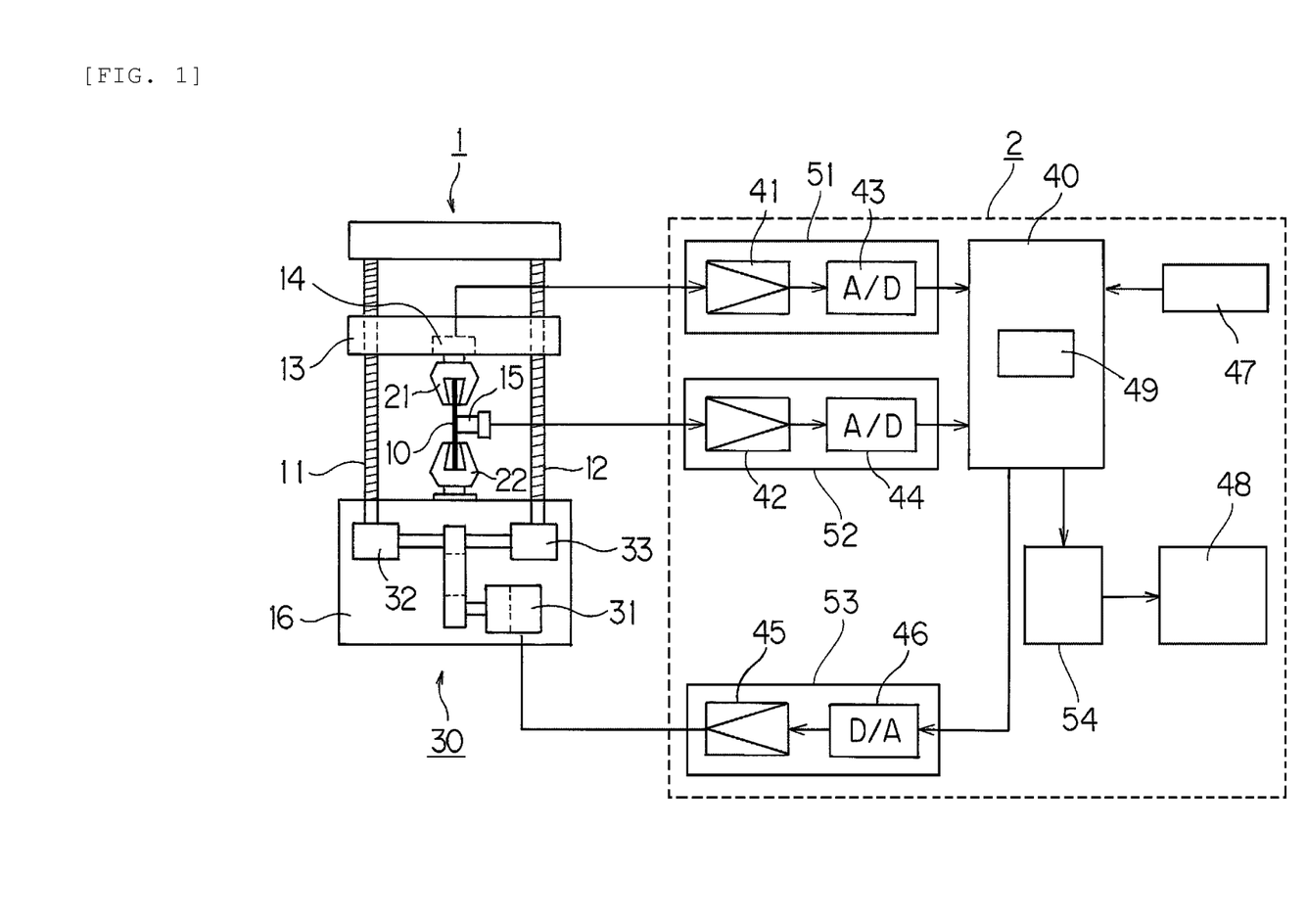
FIG. 1 is a schematic diagram of a material testing machine according to the invention.

Hereinafter, an embodiment of the invention will be described with reference to accompanying drawings. FIG. 1 is a schematic diagram of a material testing machine according to the invention.

A testing machine main body 1 and a control device 2 constitute this material testing machine. The testing machine main body 1 is provided with a table 16, a pair of screw rods 11 and 12 rotatably standing on the table 16 while facing a vertical direction, a crosshead 13 movable along the screw rods 11 and 12, a load mechanism 30 for giving a load to a test piece 10 by moving the crosshead 13, and a load cell 14 and a displacement meter 15 as measuring devices measuring a change in physical quantity in the test piece 10.

The crosshead 13 is connected to the pair of screw rods 11 and 12 via nuts (ball nuts, not illustrated). Worm reducers 32 and 33 of the load mechanism 30 are connected to the lower end portions of the screw rods 11 and 12, respectively. The worm reducers 32 and 33 are connected to a servomotor 31, which is a driving source for the load mechanism 30, and are configured such that rotation of the servomotor 31 is transmitted to the pair of screw rods 11 and 12 via the worm reducers 32 and 33. As a result of rotation of the servomotor 31, the pair of screw rods 11 and 12 synchronously rotate, and then the crosshead 13 moves upward or downward along the screw rods 11 and 12.

An upper gripper 21 for gripping the upper end portion of the test piece 10 is attached to the crosshead 13. A lower gripper 22 for gripping the lower end portion of the test piece 10 is attached to the table 16. In a case where a tensile test is performed, the test piece 10 is loaded with a test force (tensile load) by the crosshead 13 being raised in a state where both end portions of the test piece 10 are gripped by the upper gripper 21 and the lower gripper 22.

A computer, a sequencer, and peripheral equipment thereof constitute the control device 2, and the control device 2 is provided with a control unit 40 that has a CPU executing a logical operation, a ROM storing an operation program required for apparatus control, a RAM temporarily storing data and so on during control, and the like and controls the entire apparatus, a test force detection board 51 on which a load amplifier 41 and an AD converter 43 are mounted, a displacement detection board 52 on which a strain amplifier 42 and an AD converter 44 are mounted, and a motor control board 53 on which a servo amplifier 45 and a DA converter 46 are mounted. The board 51 and the board 52 correspond to the physical quantity detection units according to the invention, and the board 53 corresponds to the load mechanism control unit according to the invention.

When the load mechanism 30 is operated, the test force that acts on the test piece 10 with both ends gripped by the upper gripper 21 and the lower gripper 22 is detected by the load cell 14, amplified by the load amplifier 41, and then digitalized by the AD converter 43 and input to the control unit 40. In addition, the displacement amount that is generated in the test piece 10 is measured by the displacement meter 15, amplified by the strain amplifier 42, and then digitalized by the AD converter 44 and input to the control unit 40.

In the control unit 40, data processing is executed with test force data and displacement amount data from the load cell 14 and the displacement meter 15 captured and feedback control of rotational drive of the servomotor 31 is executed by means of fluctuations in the test force and the displacement amount input as digital data. The servomotor 31 is driven to rotate by a current supplied from the servo amplifier 45. The servo amplifier 45 supplies the servomotor 31 with the current in accordance with the magnitude according to a rotational angular velocity command supplied from the control unit 40 via the DA converter 46.

An input unit 47 is connected to the control unit 40 to receive various types of input from an operator. In addition, a display section 48 is connected to the control unit 40 via a graphic board 54 on which a graphics processing unit (GPU) is mounted, and the display section 48 displays the displacement amount and the test force calculated in the control unit 40. The graphic board 54 corresponds to the display unit according to the invention. Furthermore, the control unit 40 is provided with a synchronous controller 49 for synchronizing operations of the AD converter 43, the AD converter 44, and the DA converter 46.

Figure 2:
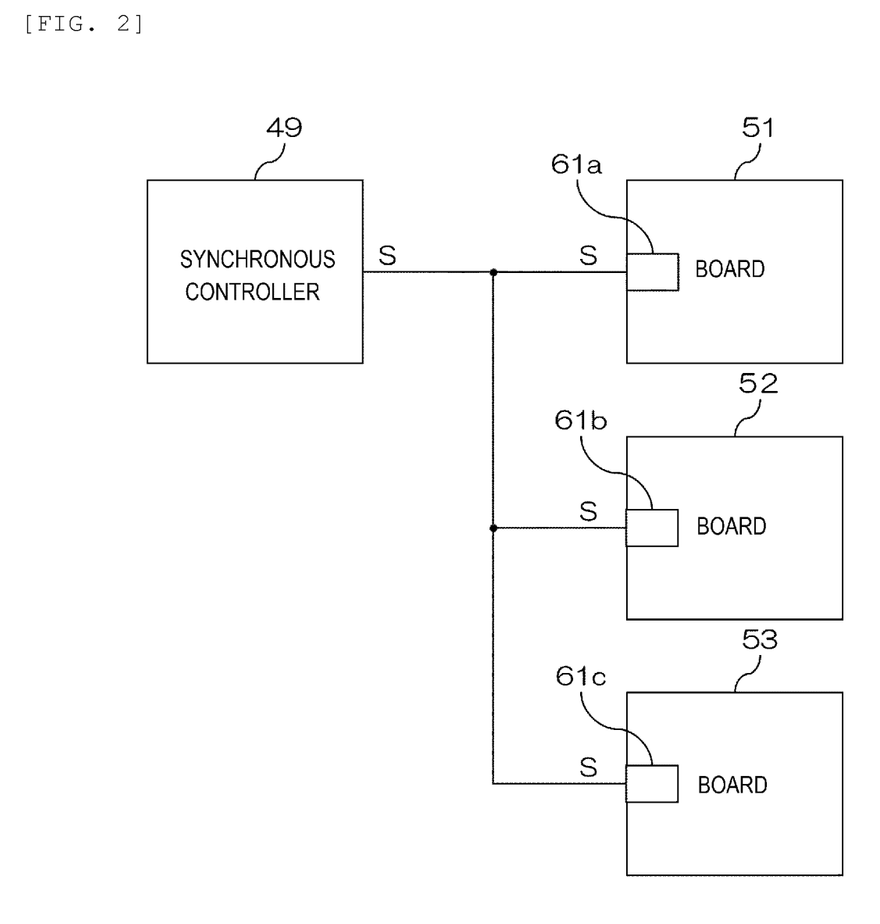
FIG. 2 is a block diagram illustrating the outline of a synchronous circuit according to the invention.

FIG. 2 is a block diagram illustrating the outline of a synchronous circuit according to the invention. In FIG. 2, wiring between the synchronous controller 49 and the boards 51, 52, and 53 are schematically illustrated.

The synchronous controller 49 is connected to each of the boards 51, 52, and 53 by one communication wire, and one communication path is formed between the synchronous controller 49 and each of the boards 51, 52, and 53. A multiple synchronization signal S in which a plurality of synchronization signals are multiplexed is transmitted from the synchronous controller 49 to each of the boards 51, 52, and 53. Signal extraction units 61a, 61b, and 61c as extraction means for recognizing synchronization signals S1, S2, and S3 included in the multiple synchronization signal S and extracting the individual synchronization signals S1, S2, and S3 are provided in the boards 51, 52, and 53, respectively. The individual synchronization signals S1, S2, and S3 are extracted from the multiple synchronization signal S input to the boards 51, 52, and 53 by the signal extraction units 61a, 61b, and 61c, respectively. Then, for example, the AD converter 43 of the board 51, the AD converter 44 of the board 52, and the DA converter 46 of the board 53 synchronously output data by the timing of the synchronization signal S1 separated from the multiple synchronization signal S.

Figure 3:
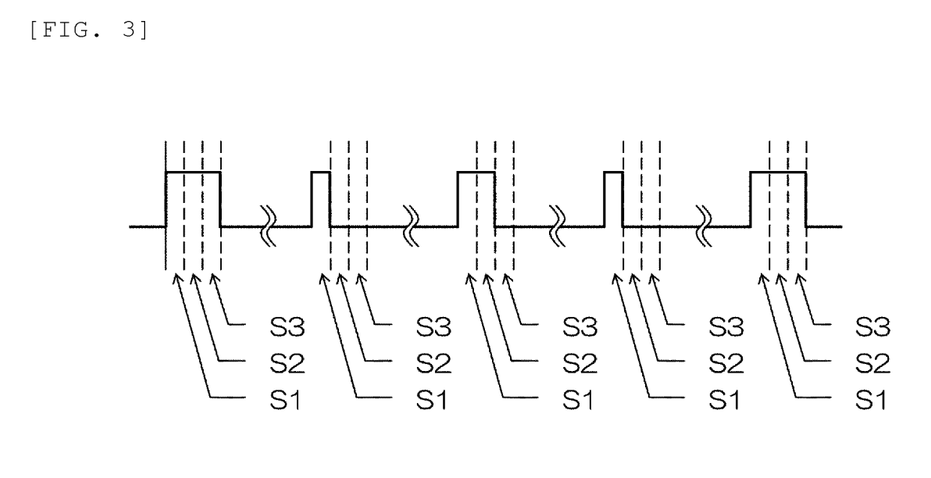
FIG. 3 is an explanatory diagram illustrating an example of a multiple synchronization signal.
Figure 4:
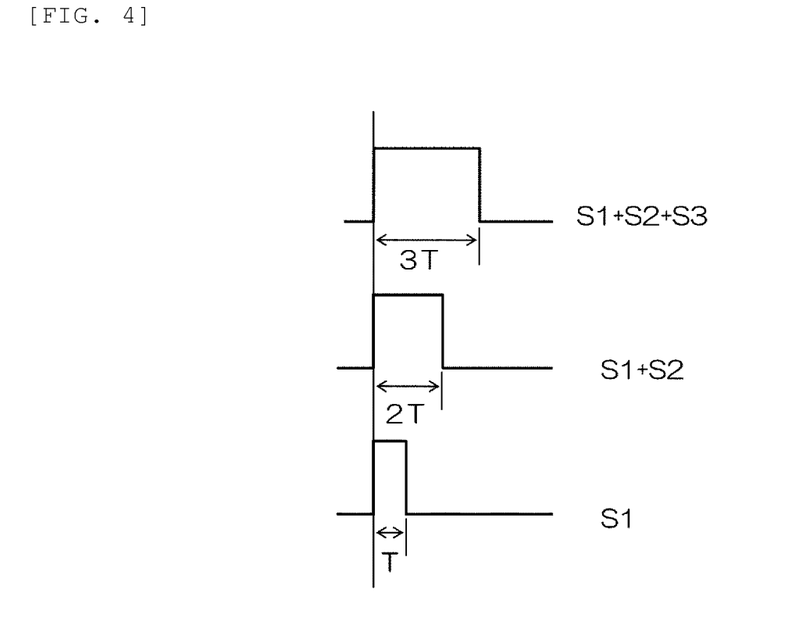
FIG. 4 is a schematic diagram describing separation of the multiple synchronization signal into individual synchronization signals.

FIG. 3 is an explanatory diagram illustrating an example of the multiple synchronization signal S. FIG. 4 is a schematic diagram describing separation of the multiple synchronization signal S into the individual synchronization signals S1, S2, and S3.

The three synchronization signals S1, S2, and S3 that have different frequencies are multiplexed in the multiple synchronization signal S illustrated in FIG. 3. The pulse train of the multiple synchronization signal S is a pulse train in which the synchronization signal S1, which has the highest frequency among the synchronization signals included in the multiple synchronization signal S, is at the head with the synchronization signal S2 that has the second-highest frequency following the synchronization signal S1 and the synchronization signal S3 that has the third-highest frequency following the synchronization signal S2. In this multiple synchronization signal S, the frequency of the synchronization signal S2 is 1/integer of the frequency of the synchronization signal S1 and the frequency of the synchronization signal S3 is 1/integer of the frequency of the synchronization signal S2. In other words, in the relationship thereof, the synchronization signals S1, S2, and S3 included in the multiple synchronization signal S have a frequency as 1/integer of the closest higher frequency. The pulse width of each pulse in the pulse train of the multiple synchronization signal S is an integral multiple of a predetermined time T, which is the pulse width of the highest-frequency synchronization signal S1.

In the case of the multiple synchronization signal S illustrated in FIG. 3, the signal extraction units 61a, 61b, and 61c confirm the ratio of the pulse width of a signal to the predetermined time T in the boards 51, 52, and 53 receiving the multiple synchronization signal S transmitted from the synchronous controller 49. In other words, the signal extraction units 61a, 61b, and 61c recognize that only the synchronization signal S1 is included in the pulse when the pulse width is 100% of the predetermined time T as shown in the lower part of FIG. 4. The signal extraction units 61a, 61b, and 61c recognize that the synchronization signal S1 and the synchronization signal S2 are included in the pulse when the pulse width is 200% of the predetermined time T as shown in the middle part of FIG. 4. The signal extraction units 61a, 61b, and 61c recognize that the synchronization signal S1, the synchronization signal S2, and the synchronization signal S3 are included in the pulse when the pulse width is 300% of the predetermined time T as shown in the upper part of FIG. 4. Then, the pulses of the synchronization signal S1, the synchronization signal S2, and the synchronization signal S3 of different timings are separated and extracted from the pulse train of the multiple synchronization signal S.

In the multiple synchronization signal S illustrated in FIG. 3, the synchronization signals S1, S2, and S3 have a frequency as 1/integer of the closest higher frequency, and thus the individual synchronization signals S1, S2, and S3 can be easily sorted out from the multiple synchronization signal S with an analog circuit using a CR filter based on capacity (C)

and resistance (R). Accordingly, in the case of the multiple synchronization signal S illustrated in FIG. 3, the circuit configuration of the respective signal extraction units 61a, 61b, and 61c of the boards 51, 52, and 53 can be simplified. Although the three synchronization signals S1, S2, and S3 with different frequencies are multiplexed in FIGS. 3 and 4, the number of multiplexed synchronization signals is not limited thereto. In addition, the extraction of the synchronization signals can be performed with a pulse width-determining sequential logic circuit (digital circuit) as well as the above-described analog circuit.

Figure 5:
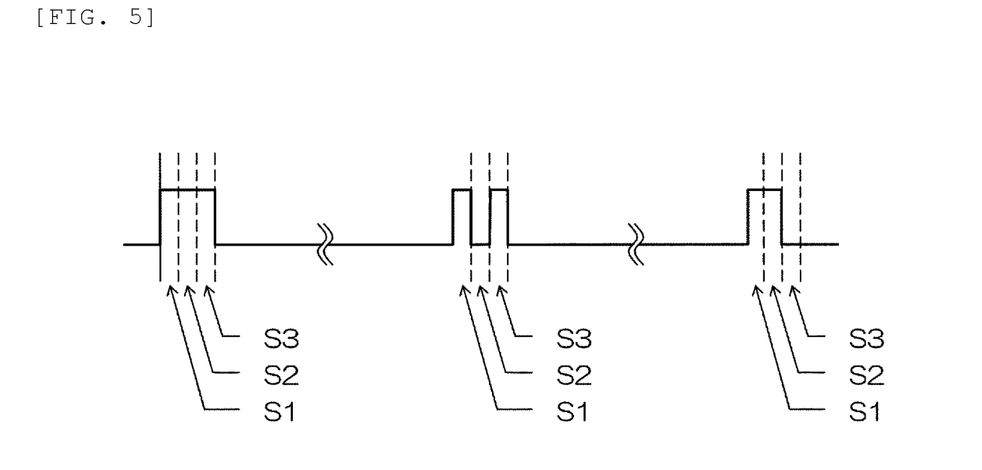
FIG. 5 is an explanatory diagram illustrating another example of the multiple synchronization signal.
Figure 6:
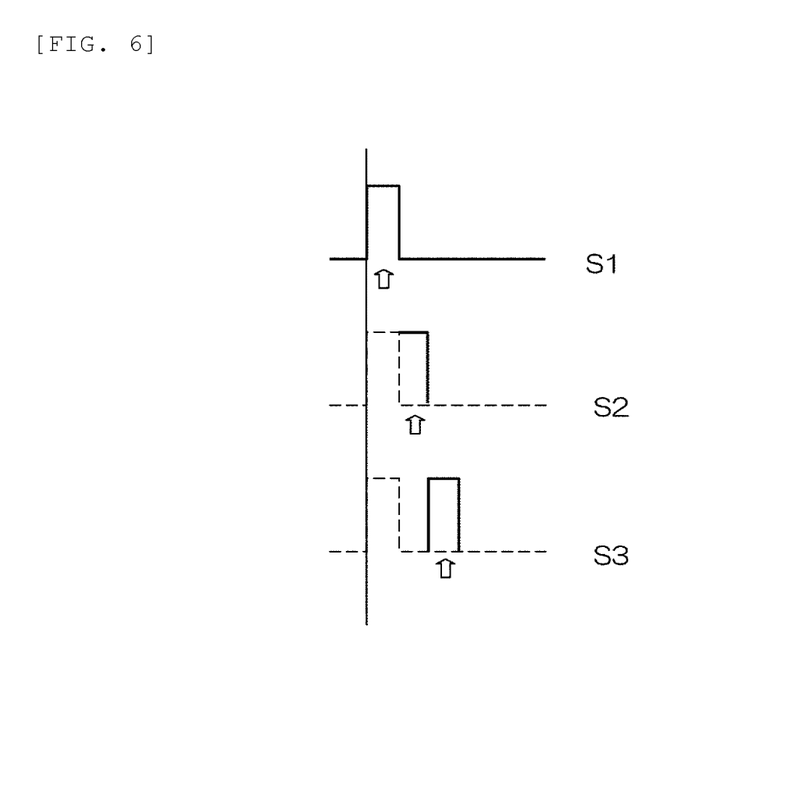
FIG. 6 is a schematic diagram describing separation of the multiple synchronization signal into individual synchronization signals.

Another example of the multiple synchronization signal will be described below. FIG. 5 is an explanatory diagram illustrating another example of the multiple synchronization signal S. FIG. 6 is a schematic diagram describing separation of the multiple synchronization signal S into the individual synchronization signals S1, S2, and S3.

The three synchronization signals S1, S2, and S3 that have different frequencies are multiplexed in the multiple synchronization signal S illustrated in FIG. 5 as is the case with the multiple synchronization signal S illustrated in FIG. 3. In the example of FIG. 5, however, the frequency of the synchronization signal S3 does not have to be 1/integer of the frequency of the synchronization signal S2, unlike in the example illustrated in FIG. 3, insofar as the frequencies of the synchronization signals S2 and S3 are 1/integer of the frequency of the highest-frequency synchronization signal S1 in the relationship of the synchronization signals S1, S2, and S3. Accordingly, the pulse train of the multiple synchronization signal S illustrated in FIG. 5 is a pulse train in which the synchronization signal S1, which has the highest frequency among the synchronization signals included in the multiple synchronization signal S, is at the head with the other synchronization signals S2 and S3 following the synchronization signal S1 in any order. In other words, the multiple synchronization signal S has a pulse train in which the pulse train of the highest-frequency synchronization signal is used as a reference and the pulses of the synchronization signals S2 and S3 with different frequencies are placed at predetermined positions behind the position of the pulse of the highest-frequency synchronization signal in the pulse train.

In the case of the multiple synchronization signal S illustrated in FIG. 5, the signal extraction units 61a, 61b, and 61c extract the pulses of the synchronization signals S2 and S3 (indicated by white arrows in the middle and lower parts of FIG. 6) following the synchronization signal S1, based on the time of the highest-frequency synchronization signal S1 (indicated by a solid line in the upper part of FIG. 6) at the head of the pulse train, in the boards 51, 52, and 53 receiving the multiple synchronization signal S transmitted from the synchronous controller 49. In the case of the multiple synchronization signal S illustrated in FIG. 5, a digital circuit constitutes the respective signal extraction units 61a, 61b, and 61c of the boards 51, 52, and 53. A sequential logic circuit appropriately set for extraction of the synchronization signals S2 and S3 is used as an example of the digital circuit. Although the three synchronization signals S1, S2, and S3 with different frequencies are multiplexed in FIGS. 5 and 6, the number of multiplexed synchronization signals is not limited thereto. In addition, a combinational logic circuit may be used as the digital circuit for the extraction of the synchronization signals S1, S2, and S3 in the signal extraction units 61a, 61b, and 61c.

Figure 7:
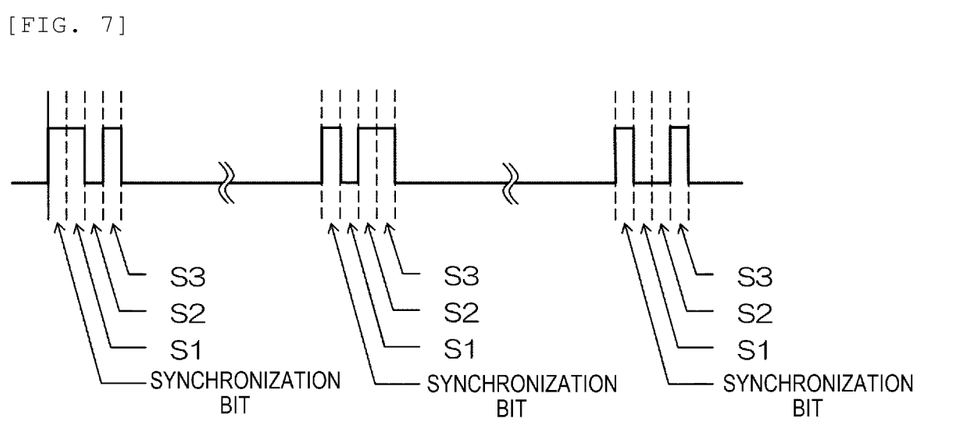
FIG. 7 is an explanatory diagram illustrating another example of the multiple synchronization signal.
Figure 8:
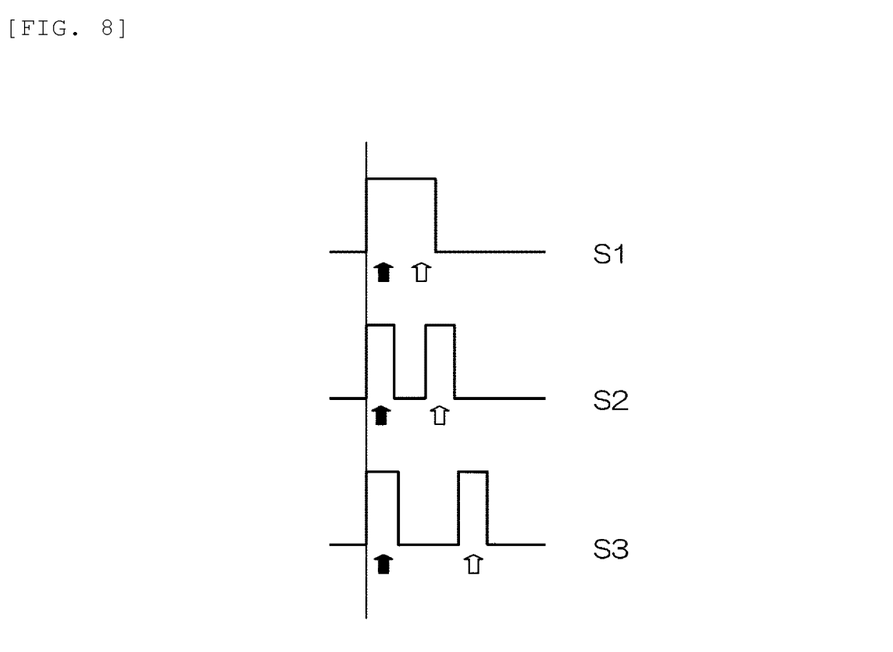
FIG. 8 is a schematic diagram describing separation of the multiple synchronization signal into individual synchronization signals.

FIG. 7 is an explanatory diagram illustrating another example of the multiple synchronization signal S. FIG. 8 is a schematic diagram describing separation of the multiple synchronization signal S into individual synchronization signals.

The three synchronization signals S1, S2, and S3 that have different frequencies and a synchronization bit are multiplexed in the multiple synchronization signal S illustrated in FIG. 7. The synchronization bit is selected from the frequencies that are common multiples of the frequencies of the synchronization signals S1, S2, and S3. The pulse train of the multiple synchronization signal S illustrated in FIG. 7 is a pulse train in which the synchronization bit as a common multiple of the frequencies of the synchronization signals S1, S2, and S3 included in the multiple synchronization signal S is at the head with the synchronization signals S1, S2, and S3 placed behind in any order. In other words, the multiple synchronization signal S has a pulse train in which each of the respective pulses of the synchronization signals S1, S2, and S3 is placed at a predetermined position with respect to the positions of the pulses of the synchronization bits, which are at predetermined intervals in the pulse train. The synchronization bit is not limited to the least common multiple of the frequencies of the synchronization signals S1, S2, and S3 insofar as the synchronization bit is a common multiple of the frequencies of the synchronization signals S1, S2, and S3.

In the case of the multiple synchronization signal S illustrated in FIG. 7, the signal extraction units 61a, 61b, and 61c extract the synchronization signals S1, S2, and S3 (indicated by white arrows in FIG. 8) following the synchronization bit, based on the time of the synchronization bit (indicated by black arrows in FIG. 8) in the pulse train, in the boards 51, 52, and 53 receiving the multiple synchronization signal S transmitted from the synchronous controller 49. In the case of the multiple synchronization signal S illustrated in FIG. 7, a digital circuit constitutes the respective signal extraction units 61a, 61b, and 61c of the boards 51, 52, and 53. A sequential logic circuit appropriately set for extraction of the synchronization signals S1, S2, and S3 is used as an example of the digital circuit. Although the three synchronization signals S1, S2, and S3 with different frequencies are multiplexed in FIGS. 7 and 8, the number of multiplexed synchronization signals is not limited thereto.

The synchronous circuit synchronizing a plurality of functional units of the material testing machine by transmitting and receiving the multiple synchronization signal S described above is used for data input or data output from a measuring device to the control unit 40 and control timing of the load mechanism 30 feedback-controlled by the control unit 40. In addition, the material testing machine according to this embodiment is provided with the graphic board 54, and display update timing at a time when the display section 48 displays results of the calculation of the test force and displacement in the test piece 10 that is executed by the control unit 40 can also be synchronized by the same synchronous circuit.

As described above, in the synchronous circuit according to the invention, no individual communication path reflecting the types of synchronization signals has to be provided between the synchronous controller 49 and each of the boards 51, 52, and 53, and thus wiring of the control device 2 can be simplified. Furthermore, the plurality of synchronization signals can be transmitted through one communication path by multiplexing, and thus an increase and decrease in synchronization signal can be easily performed without a physical change in circuit design.

REFERENCE SIGNS LIST

1 Testing machine main body
2 Control device

10 Test piece
11 Screw rod
12 Screw rod
13 Crosshead
14 Load cell
15 Displacement meter
16 Table
21 Upper gripper
22 Lower gripper
39 Load mechanism
31 Servomotor
32 Worm reducer
33 Worm reducer
40 Control unit
41 Load amplifier
42 Strain amplifier
43 AD converter
44 AD converter
45 Servo amplifier
46 DA converter
47 Input unit
48 Display section
49 Synchronous controller
51 Board
52 Board
53 Board
54 Graphic board
61a, 61b, 61c Signal extraction unit

The invention claimed is:

1. A synchronous circuit for a material testing machine, the synchronous circuit being provided with a synchronous controller synchronizing operations of a plurality of functional units constituting the material testing machine,
wherein communication paths are provided to be connected to the synchronous controller and the respective functional units,
wherein the synchronous controller transmits a multiple synchronization signal in which at least one of the synchronization signals has a different frequency from other synchronization signals are multiplexed to the plurality of functional units via one communication path,
wherein each of the plurality of functional units is provided with extraction means and the extraction means recognize and extract the respective synchronization signals from the multiple synchronization signal, and
wherein the multiple synchronization signal is a signal in which a signal with a frequency as a common multiple of frequencies of the plurality of synchronization signals included in the multiple synchronization signal is multiplexed and has a pulse train in which a pulse train of the highest-frequency synchronization signal is used as a reference and pulses of the other synchronization signals are placed at predetermined positions behind a position of a pulse of the highest-frequency synchronization signal in the pulse train.

2. The synchronous circuit for a material testing machine according to claim 1,
wherein the multiple synchronization signal includes a synchronization bit as a common multiple of frequencies of the plurality of synchronization signals included in the multiple synchronization signal and has a pulse train in which respective pulses of the plurality of synchronization signals are placed at predetermined different positions with respect to a position of the synchronization bit in the pulse train.

3. The synchronous circuit for a material testing machine according to claim 2,
wherein a digital circuit constitutes the extraction means.

4. The synchronous circuit for a material testing machine according to claim 1,
wherein a digital circuit constitutes the extraction means.

5. A material testing machine comprising:
a load mechanism giving a test load to a test piece;
a measuring device detecting a change in physical quantity in the test piece; and
a control device including a calculation control unit calculating a controlled variable of the load mechanism and calculating a physical quantity based on a value detected by the measuring device and a display section displaying a result of the calculation by the calculation control unit,
wherein the control device includes
a load mechanism control unit converting the controlled variable calculated by the calculation control unit into an operation signal of a power source of the load mechanism and outputting the operation signal,
a physical quantity detection unit receiving input from the measuring device, and
a display unit for displaying the physical quantity calculated by the calculation control unit in the display section, and
wherein the control device includes the synchronous circuit for a material testing machine according to claim 1.

6. A synchronous circuit for a material testing machine, the synchronous circuit being provided with a synchronous controller synchronizing operations of a plurality of functional units constituting the material testing machine,
wherein communication paths are provided to be connected to the synchronous controller and the respective functional units,
wherein the synchronous controller transmits a multiple synchronization signal in which at least one of the synchronization signals has a different frequency from other synchronization signals are multiplexed to the plurality of functional units via one communication path,
wherein each of the plurality of functional units is provided with extraction means and the extraction means recognize and extract the respective synchronization signals from the multiple synchronization signal, and
wherein the multiple synchronization signal is a signal in which each of the plurality of synchronization signals included in the multiple synchronization signal is a multiplexed signal with a frequency as a common multiple of frequencies of the plurality of synchronization signals and a pulse width in a pulse train varies with the number of the plurality of synchronization signals included in the multiple synchronization signal.

7. The synchronous circuit for a material testing machine according to claim 6, wherein an analog circuit or a digital circuit constitutes the extraction means.

8. The synchronous circuit for a material testing machine according to claim 6,
wherein the multiple synchronization signal includes a synchronization bit as a common multiple of frequencies of the plurality of synchronization signals included in the multiple synchronization signal and has a pulse train in which respective pulses of the plurality of synchronization signals are placed at predetermined different positions with respect to a position of the synchronization bit in the pulse train.

9. A material testing machine comprising:

a load mechanism giving a test load to a test piece;

a measuring device detecting a change in physical quantity in the test piece; and a control device including a calculation control unit calculating a controlled variable of the load mechanism and calculating a physical quantity based on a value detected by the measuring device and a display section displaying a result of the calculation by the calculation control unit, wherein the control device includes a load mechanism control unit converting the controlled variable calculated by the calculation control unit into an operation signal of a power source of the load mechanism and outputting the operation signal, a physical quantity detection unit receiving input from the measuring device, and a display unit for displaying the physical quantity calculated by the calculation control unit in the display section, and wherein the control device includes the synchronous circuit for a material testing machine according to claim 6.

* * * * *